United States Patent [19]

Onysko et al.

[11] Patent Number: 4,974,389

[45] Date of Patent: Dec. 4, 1990

[54] WOODEN STRUCTURAL MEMBER

[75] Inventors: Donald M. Onysko, Gloucester; W. H. Ernest Hsu, Orleans; Robert K. Elias, Quebec, all of Canada

[73] Assignee: Nordel, Bernieres, Canada

[21] Appl. No.: 446,193

[22] Filed: Dec. 5, 1989

[51] Int. Cl.[5] .............................................. B32B 31/00

[52] U.S. Cl. ........................................ 52/729; 52/730; 144/347

[58] Field of Search .......................... 52/729, 730, 690; 403/381, 354, 375; 144/345–347, 354

[56] References Cited

U.S. PATENT DOCUMENTS

| | | | |
|---|---|---|---|
| 1,954,242 | 4/1934 | Heppenstall | 403/381 |
| 3,490,188 | 1/1970 | Troutner | 52/729 X |
| 3,960,637 | 6/1976 | Ostrow | 52/729 X |
| 4,191,000 | 3/1980 | Henderson | 52/729 |
| 4,195,462 | 4/1980 | Keller et al. | 52/729 X |
| 4,249,355 | 2/1981 | Anderson et al. | 403/381 X |
| 4,336,678 | 6/1982 | Peters | 52/729 |
| 4,413,459 | 11/1983 | Lambuth | 52/729 |
| 4,436,342 | 3/1984 | Nilson et al. | 403/381 X |
| 4,456,497 | 6/1984 | Eberle | 52/729 X |
| 4,715,162 | 12/1987 | Brightwell | 52/729 |
| 4,757,809 | 7/1988 | Koeneman et al. | 403/354 X |

FOREIGN PATENT DOCUMENTS

| | | | |
|---|---|---|---|
| 0075912 | 6/1953 | Denmark | 144/345 |
| 0403865 | 1/1946 | Italy | 144/354 |
| 8603240 | 7/1988 | Netherlands | 52/729 |

*Primary Examiner*—David A. Scherbel
*Assistant Examiner*—Lan Mai
*Attorney, Agent, or Firm*—Berman, Aisenberg & Platt

[57] ABSTRACT

There is provided a new and useful wooden structural member comprising a pair of elongated flanges each having a surface and a longitudinally extending groove in the surface, the groove having a bottom and tapering from the surface to the bottom; and a web disposed between the flanges and having first and second tapered longitudinal edges, the edges secured within respective ones of the grooves, each edge having a longitudinally extending central kerf therein; and wherein, prior to the insertion of said edges into said grooves, the thickness of each tapered edge at any given distance from its extremity is greater than the width of the respective groove at an equal distance from the bottom. A method for the production of the member is also provided.

26 Claims, 4 Drawing Sheets

WOODEN STRUCTURAL MEMBER

FIELD OF THE INVENTION

This application relates to wooden structural members and to a method for producing such a member.

BACKGROUND OF THE INVENTION

Wooden structural members are used increasingly in a number of building applications. This can be seen, for example, in the use of wooden I-beams to replace conventional solid wood 2×8, 2×10 and other size lumber in the supporting structure for floors, roofs and the like. Such structural members are of substantially greater stiffness than conventional lumber elements and can thus be used over greater spans. Advantages are thus offered for example, in the elimination of supporting division walls and of foundation work below such walls.

There are thus ongoing attempts to develop such members offering advantages in ease of manufacture and in reliability.

The structural members under discussion here will comprise flange members which include aligned grooves in opposed surfaces. One or more web members will be positioned between the opposed faces of the flanges with the edges of the web inserted into the grooves.

The primary difficulty in constructing these wooden structural members has been in achieving a good joint between the web and the flanges.

Several types of problems arise in attempting to manufacture wooden I-beams. These relate to the manufacturing process itself, to the glue line achieved during manufacturing and to the problem of swelling due to uptake of moisture which is inherent in the materials used.

The manufacturing problems arise primarily out of the need to manufacture at high speed in order to have an economically viable product. For example, it may well be the case that the use of a jig to hold the components of the member in position during the setting of the glue, which subsequently holds the components together, would in itself eliminate economic viability. Thus, the flange to web joint must be one which can achieve an acceptable glue line without the use of such jigs.

A further manufacturing problem is the rather basic one that the components must be able to be fitted together quickly without irregular or unexpected disruptions during assembly. For example, the edge of the web must move smoothly into the mouth of the groove without interference at the outside edges of the groove.

Problems involved in establishing an acceptable glue line are related to the above manufacturing problems. For example, the web must be readily insertable into the groove in the flange but at the same time, once inserted, must provide good continuous pressure at all points between the interior surfaces of the groove and the exterior surfaces of the inserted part of the web. Furthermore, such a glue line requires good distribution of glue within the joint.

Both the manufacturing and the glue line problems are related to a third inherent problem which is always present in working with wood. This third problem relates to swelling or shrinkage of wood arising from the changing moisture content of the wood and the changing stresses within the wood. Thus, for example, when a groove is produced in a piece of solid lumber, the release of stress in the wood can cause the groove to open substantially in a short period of time. Similarly, a change in moisture content of the various wooden components can dramatically affect the size of the wood, as, for example, the thickness of the web. It is therefore essential that the joint take into account this problem, since catastrophic failure of the flange may otherwise result.

To date no joint is available which addresses in an adequate way and reconciles differences between these various types of problems.

Against this background the present invention provides a structural member having an improved web to flange joint.

PRIOR ART

There has been a substantial amount of development in the area of wooden structural members, and the following Patents are of interest in that regard.

Troutner, Canadian Pat. No. 1,039,039, issued Sept. 26, 1978, (U.S. Pat. No. 3,894,908) illustrates a basic wooden I-beam configuration in which the tapered edges of a web member are inserted into tapered grooves in flange members, the tapered edges intended to exactly fit the tapered grooves.

Ostrow, U.S. Pat. No. 3,960,637 is of interest but does not provide a similar type of web and flange member as that to which the present invention is directed.

Henderson, U.S. Pat. No. 4,191,000, issued Mar. 4, 1980, provides flange members including double tapered grooves separated by a tongue which extends into a kerf in the web member.

Keller, U.S. Pat. No. 4,195,462, issued Apr. 1, 1980, provides another arrangement in which the flanges include a pair of diverging grooves separated by a tongue which extends into a kerf in the web member.

Peters, U.S. Pat. No. 4,336,678, issued June 29, 1982, provides a web number given a particular type of scalloped edge treatment.

Eberle, U.S. Pat. No. 4,456,497, issued June 26, 1984, provides an arrangement in which the flanges include tapered grooves but in which the web member is not tapered. A kerf in the web member permits the edge of the web member to assume something of the shape of the tapered groove.

Finally, Brightwell, U.S. Pat. 4,715,162, issued Dec. 29, 1987, provides an arrangement in which a particular treatment is given to the tapered edges of the web member.

BRIEF SUMMARY OF THE INVENTION

A structural member has now been developed which provides an improved web to flange joint through the provision of an advantageous treatment leading to the resolution of stress problems and an improved glue line. Furthermore, fabrication advantages are provided.

Accordingly, the invention provides a wooden structural member comprising a pair of elongated flanges each having a surface and a longitudinally extending groove in the surface, the groove having a bottom and tapering from the surface to the bottom; and a web disposed between the flanges and having first and second tapered longitudinal edges, the edges secured within respective ones of the grooves, each edge having a longitudinally extending central kerf therein, and wherein, prior to insertion of the edges into the grooves the thickness of each tapered edge at any given distance from its extremity is greater than the width of the respective groove at an equal distance from the bottom.

In a further preferred embodiment the depth of the kerfs exceeds the depth of the grooves.

In a further embodiment there is provided a method for the production of wooden structural members comprising forming a longitudinal tapered groove, having a bottom, in a surface of each one of a pair of elongated flanges; tapering the longitudinal edges of a web such that the thickness of the edges at any given distance from their extremity is greater than the width of the grooves at an equal distance from said bottom; and forming a longitudinally extending central kerf in the edges; applying glue to at least one of either the exterior surfaces of the edges or the interior surfaces of the groove; and inserting the edges into the grooves.

GENERAL DESCRIPTION

As discussed above, there are a range of problems associated with the manufacture and use of wooden structural members. In order to overcome or alleviate the effects of those problems, certain general considerations will apply to new developments with respect to such members. First, in manufacturing terms it is highly desirable that the flanges and web members which generally comprise the components of wooden structural members be capable of very rapid assembly and that no jigs or fasteners such as nails be required to secure the components together during the glue setting step, gluing being the normal means of securing the components together. To achieve a good glue line it is essential, as well, that the surfaces of the grooves in the flange members and the inserted edges of the web members be in continuous and unshifting contact over the entirety of the contiguous surfaces, separated only by the glue film.

Finally, a good web to flange joint must take into account the virtual impossibility of obtaining close tolerances in working with wood and the effects of swelling on tolerances. Swelling occurs both as a result of moisture uptake and excess glue.

The swelling factor in particular is highly sensitive to the particular material utilized in the web section of the structural member.

The present invention offers advantages in overcoming the above problems through the provision of a structural member comprising flange members having opposed faces which include grooves therein and which are joined by web members the edges of which are inserted into the grooves. The grooves and the edges of the web member are tapered, and the edges of the web member are provided with a longitudinally extending central kerf. Specific preferred configurations are discussed below.

The term "longitudinal" is intended to mean the dimension along which the web to flange joint will occur and is intended to include variations such as discontinuous webs and waveform joint lines.

It is noted that for purposes of illustration the description is related to a wooden I-beam, but that similar considerations apply to a variety of structural members to which the invention may be applied.

The present invention avoids the difficulties associated with variations of thickness in the web material by using rotating knives to taper the web material on the outside walls of the legs and, preferably, by cutting a kerf whose depth is greater than the depth of the groove into which the web insert fits.

By tapering the exterior walls of the legs so that the web insert narrows toward the tip it is easier to feed the web into the groove of the flange material without one leg catching on the face of the flange material to the side of the groove. Consequently fabrication can proceed very quickly.

A further advantage of tapering the exterior walls of the web insert is specifically related to the use of the preferred waferboard as the web material. Generally, because of its very high in plane shear strength waferboard is the material of choice for use as a web material. That material also has drawbacks which must be taken into account. One drawback is that the bare unmodified surface of a sheet of waferboard glues very poorly. Waferboard is manufactured by pressing a mixture of wood wafers, glue and wax between two hot metal platens. During the pressing process, surfaces are highly densified and are thus smooth. The smooth face bonds poorly because glue has difficulty penetrating that surface. Also it is a common practice that one surface is roughened with a screen during manufacture. The bond to the rough surface is variable because, being rough, some of the surface wafers themselves will not be perfectly bonded to the body of the board.

Consequently, when the exterior walls of a waferboard web insert are tapered with rotating knives, surface contaminants that can inhibit glue bonding are removed, and, in addition, the glue bond to the tapered exterior wall of the web insert is distributed across several layers of wafers rather than depending exclusively on surface wafers which may, for many reasons, be improperly bonded to the web substrate.

The outer corner of the tip of each leg is preferably rounded to further assist in guiding the web insert into the groove without interference. A further substantial advantage of this rounding is to permit glue that has been applied on the wall of the groove to ride up under the tip of the leg and remain on the wall rather than being pushed down the wall to the base of the groove. In conventional type joints this feature is of less importance because the corners of the web insert tip are not forced tightly against the wall of the groove until they reach the base of the groove.

It is highly preferred in the present invention that the thickness of the tapered edge at any given distance from its outer extremity be greater than the width of the receiving groove at an equal distance from the bottom of the groove. Consequently, on insertion, the rounded corners push hard against the sides of the groove at some distance above the bottom of the groove. If a joint of the present type had squared outer corners, then those sharp corners, which push hard against the groove walls during insertion, would scrape away glue applied to the walls and push it to the base of the groove after which excess glue would be forced up into the kerf at the centre of the joint. As a result the important glue line along the walls of the groove would be starved since there would be no or insufficient glue available to penetrate and fill gaps in the wood on each face to ensure a good bond.

The kerf has a number of important functions in the present invention. It is highly preferred that the relationship between the width of the groove at its base and the width of the web insert at its tip be adjusted so that the kerf narrows at its mouth, but does not fully close when the web insert has reached the base of the groove. This feature ensures that it is always possible to push the web insert all the way to the base of the groove. When the web insert is able to extend all the way to the base of the groove the surface area of the glue line is maximized, improving the quality of the joint. In addition, because the mouth of the kerf is always open, glue which is trapped at the base of the groove can escape up the kerf instead of pushing the web insert out of the groove.

A further means of ensuring that the web insert will remain in place is to provide a protrusion/indentation mating arrangement between the side surfaces of the groove and of the insert. Thus, for example, the insert may include a longitudinal ridge on its side surfaces to mate with a longitudinal indentation in the groove surfaces when the insert is fully inserted into the groove. Clearly the ridge could be in the groove and the indentation in the insert. Further, the mating parts could be located at any desired depth on the surfaces.

The primary function of the kerf, however, is to prevent the web insert from splitting the flange when the waferboard or other sheet material of which the web insert is made picks up moisture in the field and swells. It is for this reason that the kerf is preferably open over its entire length. In one variation the joint design allows for the mouth of the kerf to be slightly larger near the tip so that a greater amount of swelling can be absorbed at this location.

The width of the web insert at its tip contributes to a reduction in the effects of swelling of the insert material. Since the insert is narrowest at its tip due to the tapering of the wall and the preferred roundness of the outer tip corners, there is less material in this area to swell and split the flange. Note also that since this material is usually farthest from an exposed region it is less likely than the top of the web insert to pick up humidity, except at the exposed end of an I-beam.

The preferred roundness of the corners at the base of the groove also reduces the effects of swelling by the web insert. When the base corners of a groove are sharp as is assumed in most previous inventions of this type, concentrated compression stresses against the groove wall induced by swelling of the web insert will focus at the sharp corner because all forces are abruptly resisted by the body of the wood at the base of the groove. As a result cracks, which can gradually increase in length, tend to develop at such sharp intersections thereby weakening the joint and reducing the strength of the I-beam. A rounded corner substantially reduces the chance of a crack developing because the forces are resisted incrementally as they proceed along the curve.

The depth of the kerf is preferably greater than the depth of the groove so that the top of the kerf is beyond the top of the groove. If the top of the kerf ended in line with or below the top of the groove then when the web swelled it would push open the groove at the top weakening the joint as previously described. If the top of the kerf was in line with the top of the groove, then swelling of the web would also induce substantial shear stresses in the web between the top of the kerf and the top of the groove weakening the web along this shear stress line.

A further advantage of locating the top of the kerf above the top of the groove opening is that it makes it possible to cut the groove so that its width at the top is slightly smaller than the width of the web when it is fully inserted; in effect narrowing the kerf at the top of the groove. This feature ensures that the legs of the web insert are pushing hard against the walls of the groove beginning right at the top. Such pressure is required to ensure good fiber to fiber contact between the opposing surfaces of the joint while the glue cures. This pressure also ensures that the web insert grips the walls of the groove thereby preventing the flanges from falling off the web insert. This characteristic reduces the need for manipulation of the I-beam by eliminating the need to hold the flanges in place with a jig or nails or other special devices while the glue line sets.

It will be noted that when the legs at the top of the kerf are pushed in by the wall of the groove there is a tendency for the legs of the kerf to push together even more closely farther down, and thereby pull away from the walls of the groove near the base. To correct for this tendency the walls of the groove preferably converge more rapidly than the walls of the web insert (narrowing the kerf near the tip of the legs) and thereby ensuring that good fiber to fiber contact is maintained over the entire length of the glue line. A further advantage in this regard could be achieved by imparting a slightly concave configuration to the walls of the groove, but this is generally not necessary.

Yet another method of overcoming this tendency by the web insert legs to pull away from the walls of the groove is to make part of the kerf nearest the mouth wider than the top half and so arrange the convergence of the groove walls so that the narrower portion of the kerf closes fully just above the location where the wider portion of the kerf begins.

As regards the materials of construction, any continuous solid wood material may be utilized for the flanges. This might include Machine Stress Rated lumber, optionally with finger joints, Laminated Veneer Lumber or Parallel Strand Lumber.

Similarly, the web of the structural member may comprise any suitable wooden sheet material such as plywood, fiberboard or, preferably, waferboard.

Applicant prefers to utilize Machine Stress Rated Lumber for the flanges and that specific type of waferboard known as oriented strand board (OSB) for the web.

As indicated above, while the description is based on the illustrated I-beam, other types of structural members such as forms of box beams, trusses, and I-beams with non-parallel flanges may utilize the invention. Furthermore, even within the I-beam category, variations such as wave form grooves and webs, discontinuous webs, and the like, are possible variations. Similarly multiple parallel webs may be utilized.

High quality glues which are suitable for use in the invention will be known to those skilled in the art. Such glues are usually phenol-resorcinols and may include melamines and isocyanates.

BRIEF DESCRIPTION OF THE DRAWINGS

In drawings which illustrate embodiments of the invention.

Figure 1:
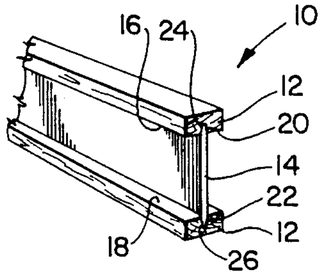
FIG. 1 is a perspective view of one embodiment of a structural member according to the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

As indicated above the invention will be described with reference to the illustrated I-beam.

The I-beam 10 comprises a pair of flanges 12 joined by web 14. The opposed surfaces 16 and 18 of I-beam 10 contain grooves 20 and 22 respectively. The longitudinal edge sections 24 and 26 of web 14 are inserted into grooves 20 and 22 respectively and secured there by gluing.

Figure 2:
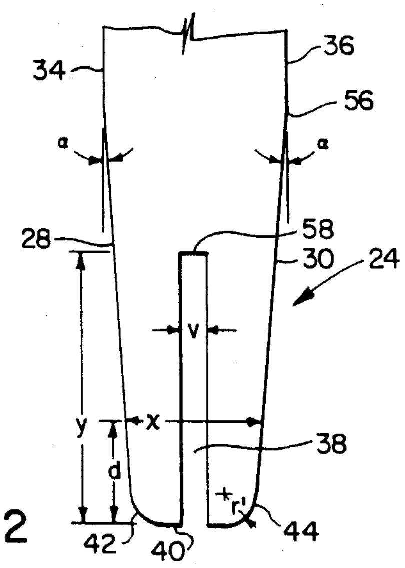
FIG. 2 is a schematic view in section of the edge of a web section of the embodiment of FIG. 1.

FIG. 2 illustrates in detail one embodiment of the edge treatment of web 14. The outer surfaces 28 and 30 in the area of edge section 24 are tapered at an angle $\alpha$ to the opposed surfaces 34 and 36 of web 14 proper. Angle $\alpha$ may for convenience be termed the angle of taper.

A kerf 38 is cut into and extends longitudinally of edge 40 of web 14.

The outer corners 42 and 44 of the extremity 40 of edge section 24 are preferably rounded with radius $R^1$.

Figure 3:
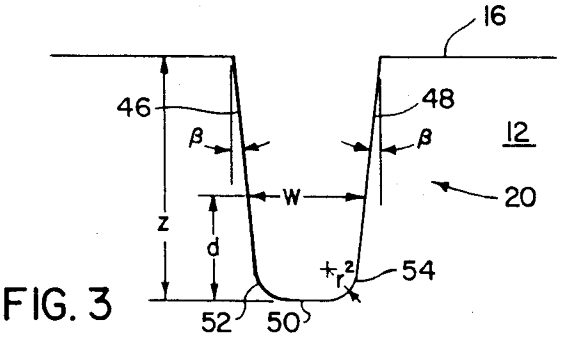
FIG. 3 is a schematic in section of a part of a grooved flange part of the embodiment of FIG. 1.

FIG. 3 illustrates in detail a groove 20 in the surface 16 of flange 12. The side surfaces 46 and 48 of groove 20 are tapered at an angle $\beta$ to the perpendicular. The angle $\beta$ may be termed for convenience the angle of taper. The outer corners 52 and 54 of bottom 50 are preferably rounded with radius $R^2$.

In the preferred case the overall depth Y of the kerf 38 is greater than the depth Z of groove 20.

In the preferred embodiment the angle $\beta$ is greater than the angle $\alpha$.

The width X of the edge section 24 at any distance d from the edge extremity 40 is greater than the width W of the groove 20 at a similar distance d from the bottom 50.

Finally, in the preferred embodiment the radius $R^1$ of the rounded corners 42 and 44 is equal to the radius $R^2$ of the rounded corners 52 and 54.

The surfaces 28 and 30 of the edge section 24 of web 14 begin their taper at a point 56 which is inward on web 14 of the base 58 of kerf 38. The distance from the point 56 to the extremity 40 (the depth of the taper) is equal to or greater than depth Z of groove 20.

Figure 4:
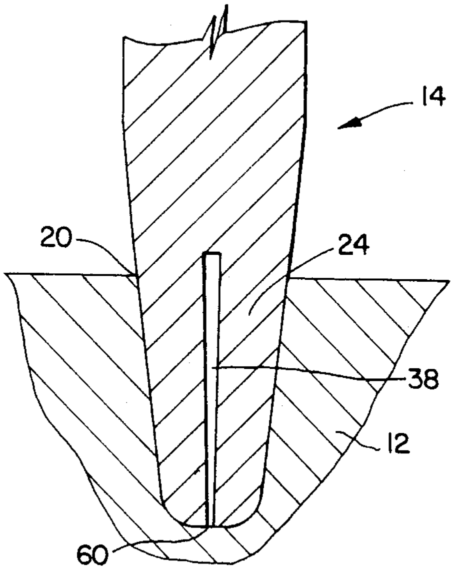
FIG. 4 is a schematic in section of an assembled joint between the web and flange of the embodiment of FIG. 1.

As illustrated in FIG. 4, the width V of kerf 38 and the width X of edge section 24 are chosen such that kerf 38 is partially opened as illustrated at 60 after insertion of the edge section 24 into the groove 20.

A typical thickness of the web 14 would be about 11.1 mm. The width W at the bottom 50 of groove 20 would be about 6.5 mm (in the absence of the rounded corners) and at the surface 16 would be about 9 mm. The depth Z of the groove is about 15 mm. Prior to insertion of the edge section 24 into the groove 20, the width of the groove at the edge extremity 40 is about 7.5 mm (in the absence of the rounded corners) and at a distance 15 mm inward of the edge 40 is about 9.5 mm. The width V of the kerf is about 1.6 mm.

Thus, when the edge section 24 is inserted into the groove 20 to the extent that the edge extremity 40 bottoms out on bottom 50, the kerf will remain opened at 60 to the extent of about 0.6 mm.

The depth Y of the kerf 38 is in the preferred case about 17 mm for a groove dept Z of 15 mm.

The flange is typically nominal 2×4 in.

The radii $R^1$ and $R^2$ may be about 2 mm.

Figure 5:
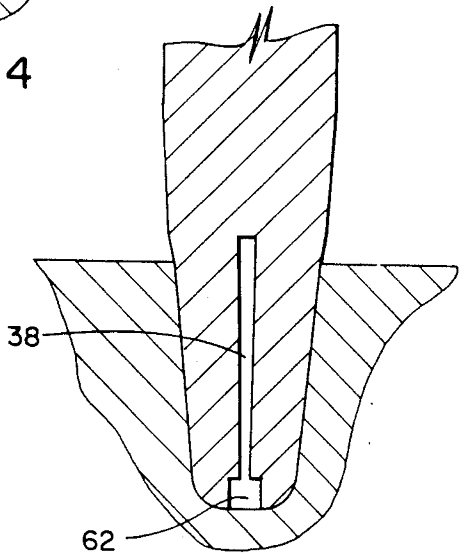
FIG. 5 illustrates a further embodiment of a joint between the web and the flange of the embodiment of FIG. 1.

FIG. 5 illustrates an embodiment of the invention in which a lower section 62 of kerf 38 is of greater width to provide advantages as discussed above.

Figure 6:
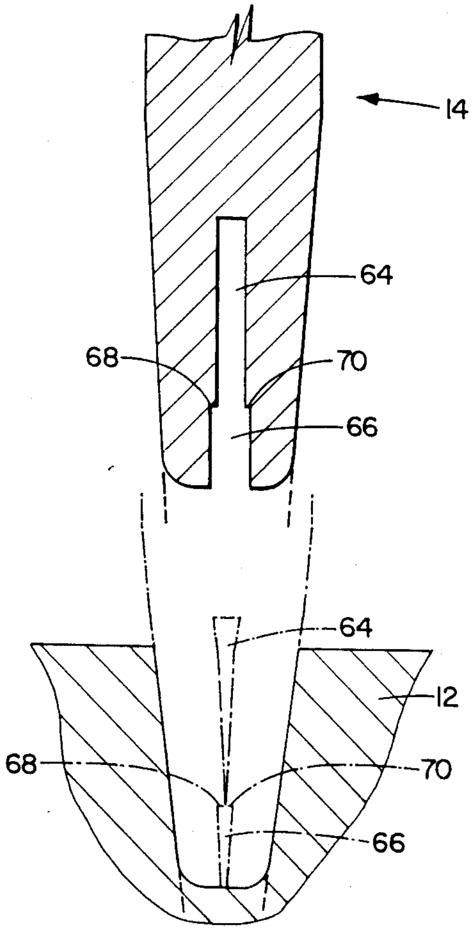
FIG. 6 illustrates a further embodiment of the web and a flange of the embodiment of FIG. 1.

The FIG. 6 embodiment illustrates the kerf 38 having a narrower inner section 64 and a wider outer section 66 the dimensions of which are chosen such that the shoulders 68 and 70 will meet when the edge section is inserted into the groove. This configuration will have the effect of ensuring good contact between the web and the groove but may be undesirable in some applications because it does not provide space for swelling in the area of contact of shoulders 68 and 70.

Figure 7:
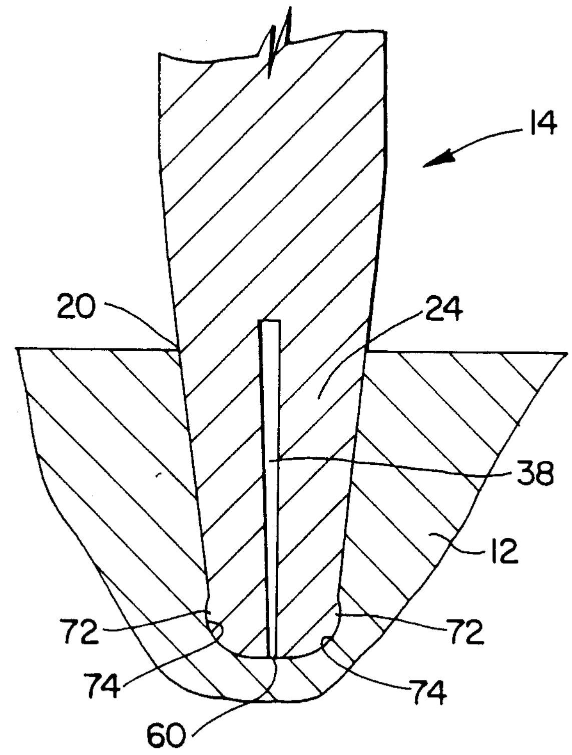
FIG. 7 illustrates a further embodiment of the web and flange of FIG. 1.

The embodiment illustrated in FIG. 7 is of benefit in maintaining the insert properly in position in the groove, particularly during glue setting.

The edge section 24 includes a longitudinally extending ridge or protrusion 72, preferably on each side. The groove 20 includes a corresponding hollow or indentation 74 for each ridge 72.

Although shown at the bottom of groove 20, the protrusion/indentation pairs could be placed wherever desired in groove 20.

Similarly, although the indentations are shown in the groove 20 and the protrusions on edge section 24, the reverse could be used.

Thus it is apparent that there has been provided in accordance with the invention a wooden structural member that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and scope of the invention.

What we claim as our invention:

1. A wooden structural member comprising:

a pair of elongated flanges each having a surface and a longitudinally extending groove in said surface, said groove having a bottom and tapering from said surface to said bottom; and a web disposed between said flanges and having first and second tapered longitudinal edges, said edges secured within respective ones of said grooves, each said edge having a longitudinally extending central kerf therein;

and wherein, prior to the insertion of said edges into said grooves, the thickness of each said tapered edge at any given distance from its extremity is greater than the width of said respective groove at an equal distance from said bottom.

2. The structural member of claim 1, wherein the width of said kerf is chosen such that said kerf remains partly open over its entire depth after said insertion.

3. The structural member of claim 1, wherein said longitudinal edges are rounded at their extremities.

4. The structural member of claim 3, wherein the edges of said bottom are rounded.

5. The structural member of claim 4, wherein prior to said insertion, the angle at which said groove tapers from said surface to said bottom is greater than the angle at which said longitudinal edges taper.

6. The structural member of claim 1, wherein prior to said insertion, the angle at which said groove tapers from said surface to said bottom is greater than the angle at which said longitudinal edges taper.

7. The structural member of claim 1, wherein the material of said flanges is chosen from lumber, machine stress rated lumber, laminated veneer lumber or parallel strand lumber.

8. The structural member of claim 7, wherein the material of said web is chosen from waferboard, fiberboard or plywood.

9. The structural member of claim 8, wherein the material of said web is oriented strand board.

10. The structural member of claim 9, wherein the material of said flange is machine stress rated lumber.

11. The structural member of claim 1, wherein the taper of said tapered edge begins at a distance inwardly of said extremity equal to or greater than the depth of said groove.

12. The structural member of any one of claims 1 to 11 wherein the depth of said kerfs exceeds the depth of said grooves.

13. A wooden structural member comprising:

a pair of elongated flanges each having a surface and a longitudinally extending groove in said surface, said groove having a bottom and tapering from said surface to said bottom; and a web disposed between said flanges and having first and second tapered longitudinal edges, said edges secured within respective ones of said grooves, each said edge having a longitudinally extending central kerf therein;

and wherein, prior to the insertion of said edges into said grooves, the thickness of each said tapered edge at any given distance from its extremity is greater than the width of said respective groove at an equal distance from said bottom, and said kerf includes prior to said insertion a first wider part adjacent said edge and a second narrower part remote from said edge.

14. The structural member of claim 13, wherein said kerf remains partly open over its entire depth after said insertion.

15. The structural member of claim 13, wherein a pair of shoulder edges are formed between said wider and said narrower parts and wherein said shoulder edges are in contact after said insertion.

16. A wooden structural member comprising:

a pair of elongated flanges each having a surface and a longitudinally extending groove in said surface, said groove having a bottom and tapering from said surface to said bottom; and a web disposed between said flanges and having first and second tapered longitudinal edges, said edges secured within respective ones of said grooves, each said edge having a longitudinally extending central kerf therein;

and wherein said groove includes two side surfaces and at least one said side surface includes a longitudinally extending indentation and said tapered edge includes corresponding longitudinally extending protrusions;

and wherein, prior to the insertion of said edges into said grooves, the thickness of each said tapered edge at any given distance from its extremity is greater than the width of said respective groove at an equal distance from said bottom.

17. The structural member of claim 16 wherein each said side surface includes a said indentation.

18. A wooden structural member comprising:

a pair of elongated flanges each having a surface and a longitudinally extending groove in said surface, said groove having a bottom and tapering from said surface to said bottom; and a web disposed between said flanges and having first and second tapered longitudinal edges, said edges secured within respective ones of said grooves, each said edge having a longitudinally extending central kerf therein;

and wherein each said edge includes on at least one side thereof a longitudinally extending indentation and said groove includes corresponding longitudinally extending protrusions;

and wherein, prior to the insertion of said edges into said grooves, the thickness of each said tapered edge at any given distance from its extremity is greater than the width of said respective groove at an equal distance from said bottom.

19. The structural member of claim 18 wherein said tapered edge includes a said indentation on each side thereof.

20. A method for the production of wooden structural members comprising:

forming a longitudinal tapered groove, having a bottom, in a surface of each one of a pair of elongated flanges;

tapering the longitudinal edges of a web such that the thickness of said edges at any given distance from their extremity is greater than the width of said grooves at an equal distance from said bottom; and forming a longitudinally extending central kerf in said edges;

applying glue to at least one of either the exterior surfaces of said edges or the interior surfaces of said groove; and inserting said edges into said groove far enough such that the outer sides of the edges are bent inwardly into the kerf.

21. The method of claim 20, comprising forming said kerf such that, on inserting said edges into said grooves, said kerf remains partly open over its entire depth.

22. The method of claim 20, comprising the additional step of rounding the interior corners of said groove and the exterior corners of said edges.

23. The method of claim 20, comprising forming said tapered grooves and tapering said edges such that the angle of taper is greater in the grooves than on the edges.

24. The method of claim 20, comprising forming said kerfs with a first wider part adjacent said edges and a second narrower part remote from said edges.

25. The method of claim 20, comprising tapering said edges such that the depth of the taper is at least equal to the depth of said grooves.

26. The method of any of claims 20 to 25, comprising forming said kerfs to a depth greater than the depth of said grooves.

* * * * *